United States Patent
Tseng et al.

(10) Patent No.: US 8,319,748 B2
(45) Date of Patent: Nov. 27, 2012

(54) TOUCH PANEL AND OUTPUT METHOD THEREFOR

(75) Inventors: Hsu-Hsiang Tseng, Taoyuan (TW); Yun-Long Tun, Taoyuan (TW)

(73) Assignee: HTC Corporation, Taoyuan (TW)

( * ) Notice: Subject to any disclaimer, the term of this patent is extended or adjusted under 35 U.S.C. 154(b) by 260 days.

(21) Appl. No.: 12/773,374

(22) Filed: May 4, 2010

(65) Prior Publication Data
US 2011/0037722 A1  Feb. 17, 2011

(30) Foreign Application Priority Data
Aug. 14, 2009  (TW) ............... 98127375 A (51) Int. Cl.
G06F 3/045 (2006.01)
G06F 3/041 (2006.01)

(52) U.S. Cl. .................. 345/174; 345/173

(58) Field of Classification Search ........... 345/173, 345/174; 178/18.05
See application file for complete search history.

(56) References Cited

U.S. PATENT DOCUMENTS

| | | | |
|---|---|---|---|
| 7,355,592 B2 | 4/2008 | Hong et al. | |
| 7,808,490 B2 * | 10/2010 | Chang et al. | 345/173 |
| 2001/0013855 A1 | 8/2001 | Fricker et al. | |
| 2005/0174335 A1 * | 8/2005 | Kent et al. | 345/173 |
| 2005/0190161 A1 | 9/2005 | Hong et al. | |
| 2008/0018611 A1 | 1/2008 | Serban et al. | |
| 2008/0207254 A1 * | 8/2008 | Pierce et al. | 455/550.1 |
| 2008/0316182 A1 * | 12/2008 | Antila et al. | 345/173 |
| 2009/0073134 A1 | 3/2009 | Huang et al. | |
| 2009/0096762 A1 | 4/2009 | Hinata | |
| 2009/0166097 A1 | 7/2009 | Chang | |
| 2009/0189875 A1 | 7/2009 | Ma | |
| 2009/0194341 A1 | 8/2009 | Nousiainen | |

FOREIGN PATENT DOCUMENTS

| | | |
|---|---|---|
| CN | 101498982 | 8/2009 |
| EP | 1811364 | 7/2007 |
| EP | 2026179 | 2/2009 |
| EP | 2 085 861 | 8/2009 |
| GB | 2456311 | 7/2009 |

OTHER PUBLICATIONS

Search Report from corresponding EPO Application No. 10163879.9 dated Aug. 23, 2010.
Office Action from corresponding EPO Application No. 10 163 879. 9, dated Apr. 1, 2011.

* cited by examiner

*Primary Examiner* — Quan-Zhen Wang
*Assistant Examiner* — Calvin C Ma
(74) *Attorney, Agent, or Firm* — Grossman, Tucker, Perreault & Pfleger, PLLC (57) ABSTRACT

A touch panel and an output method therefor are disclosed. The touch panel includes a first substrate, a second substrate, spacers, and a controller set. The first substrate is flexible and has a first electrode layer. The second substrate has a second electrode layer facing the first electrode layer. The spacers are configured between the first and the second substrates. The controller set electrically connects to the first and the second electrode layers to provide a first operation mode and a second operation mode. The controller set can apply a uniform voltage drop electrical field on the first electrode layer or the second electrode layer, so that a resistive touch panel configuration is formed during the first operation mode. The controller set can also apply a uniform electrical field on the first electrode layer, so that a capacitive touch panel configuration is formed during the second operation mode.

13 Claims, 6 Drawing Sheets

TOUCH PANEL AND OUTPUT METHOD THEREFOR

CROSS-REFERENCES TO RELATED APPLICATIONS

This application claims priority to Taiwan Patent Application No. 098127375 filed on Aug. 14, 2009.

BACKGROUND OF THE INVENTION

1. Field of the Invention

The present application provides a touch panel and output methods therefor. More particularly, the present application provides a touch panel with characteristics of a resistive touch panel configuration and a capacitive touch panel configuration and an output method therefor.

2. Descriptions of the Related Art

As science and technology have progressed, computer-related products have continued developing. The input method for the computer-related products, especially for portable electronic devices such as mobile phones, personal digital assistants (PDAs) and the like, has evolved from traditional keypads to the commonly used touch panels. Consequently, a user can simply perform input and control operations through the touch panel of the device.

Figure 1A:
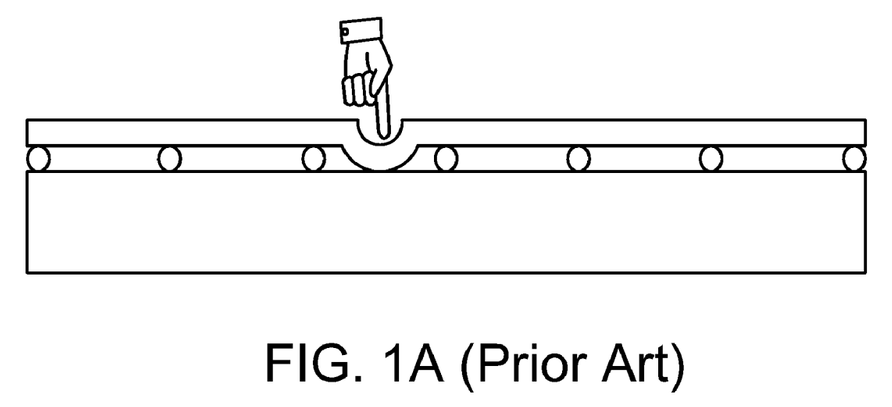
FIG. 1A is a schematic view illustrating the operating principles of a conventional resistive touch panel.
Figure 1B:
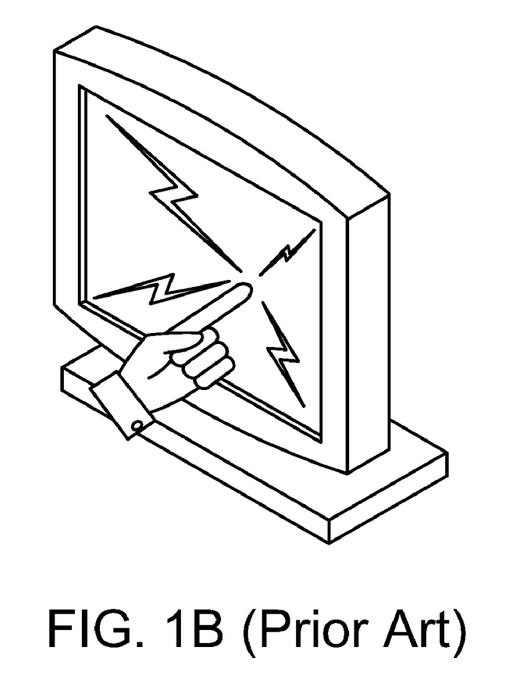
FIG. 1B is a schematic view illustrating the operating principles of a conventional capacitive touch panel.

Typically, there are two types of touch technologies applied in touch panels: the resistive touch panel technology and the capacitive touch panel technology. FIG. 1A illustrates a schematic view of the operating principles of a resistive touch panel. The resistive touch panel operates primarily on the following principles: a pressing force is applied to an upper conductive substrate by a tool (e.g. a stylus), so that a close circuit is built between the two conductive substrates that are original vertically spaced from each other. A current is thus generated, and then a location where the touch panel is pressed is calculated according to the current. On the other hand, FIG. 1B illustrates a schematic view of the operating principles of a capacitive touch panel. The capacitive touch panel operates primarily on the following principles: an electrical field is applied to an upper conductive substrate, and once the finger of a user touches the upper conductive substrate, a variation in the electrical field of the upper conductive substrate will therefore occur and current will flow from the four corners of the upper conductive substrate after being grounded from the finger. Finally, according to the amount of the current flowing from the four corners, the location of the touch point on the panel can be calculated.

When using the resistive touch panel, sliding or gesture actions often make it impossible for the user's finger to continuously apply a pressure on the panel, causing a lack of continuous conduction between the upper and the lower conductive substrates.

SUMMARY OF THE INVENTION

The present application is to provide a touch panel with advantages of resistive touch operations and capacitive touch operations.

The present application provides a touch panel, comprising a first substrate, a second substrate, a plurality of spacers and a controller set. The first substrate is a flexible substrate and has a first electrode layer. The second substrate has a second electrode layer facing the first electrode layer. The spacers are disposed between the first substrate and the second substrate. The controller set is electrically connected to the first electrode layer and the second electrode layer to provide a first operation mode and a second operation mode. During the first operation mode, the controller set applies a uniform voltage drop electrical field on the first electrode layer or the second electrode layer to form a resistive touch panel configuration. During the second operation mode, the controller set applies a uniform electrical field on the first electrode layer to form a capacitive touch panel configuration.

The present application is to provide an output method for the aforesaid touch panel, which detects an input tool used by a user and, depending on the differences among different input tools, selects the most appropriate operation module for subsequent operations.

The present application also provides an output method for the aforesaid touch panel to detect the touch of a user on the first substrate. The output method comprises the following steps: forming a uniform voltage drop electrical field on the first electrode layer or the second electrode layer to generate a first input signal in response to the touch during the first operation mode; forming a uniform electrical field on the first electrode layer to generate a second input signal in response to the touch during the second operation mode; and determining a user interface according to the first input signal and the second input signal.

The present application is to provide an output method for the aforesaid touch panel. The input method detects a touch location by using the resistive touch panel configuration and capacitive touch panel configuration. The accurate coordinates of the touch location are calculated for subsequent operations.

The present application provides an output method for the aforesaid touch panel to detect a touch of a user on the first substrate and comprises the following steps: forming a uniform voltage drop electrical field on the first electrode layer or the second electrode layer to generate a first input signal in response to the touch during the first operation mode; forming a uniform electrical field on the first electrode layer to generate a second input signal in response to the touch during the second operation mode; and calculating a data of the touch location according to a predetermined ratio of the first input signal to the second input signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present application discloses a touch panel with advantages of resistive touch operations and capacitive touch operations. In particular, the touch panel of the present application integrates the two touch panel configurations together by not stacking them directly, so it has less impact on the display luminance. Hereinafter, a conventional five-wire resistive touch panel will be described as an example to describe how to integrate the resistive touch panel configuration and the capacitive touch panel configuration together by rearranging the circuit design of the electrode layer. However, this embodiment does not mean that the present invention is only limited to a touch panel of a five-wire configuration. Instead, any of those skilled in the art may apply the present application to touch panels of other configurations upon reviewing the disclosure of the present application; and for the sake of simplicity, this will be omitted from description herein.

Figure 2:
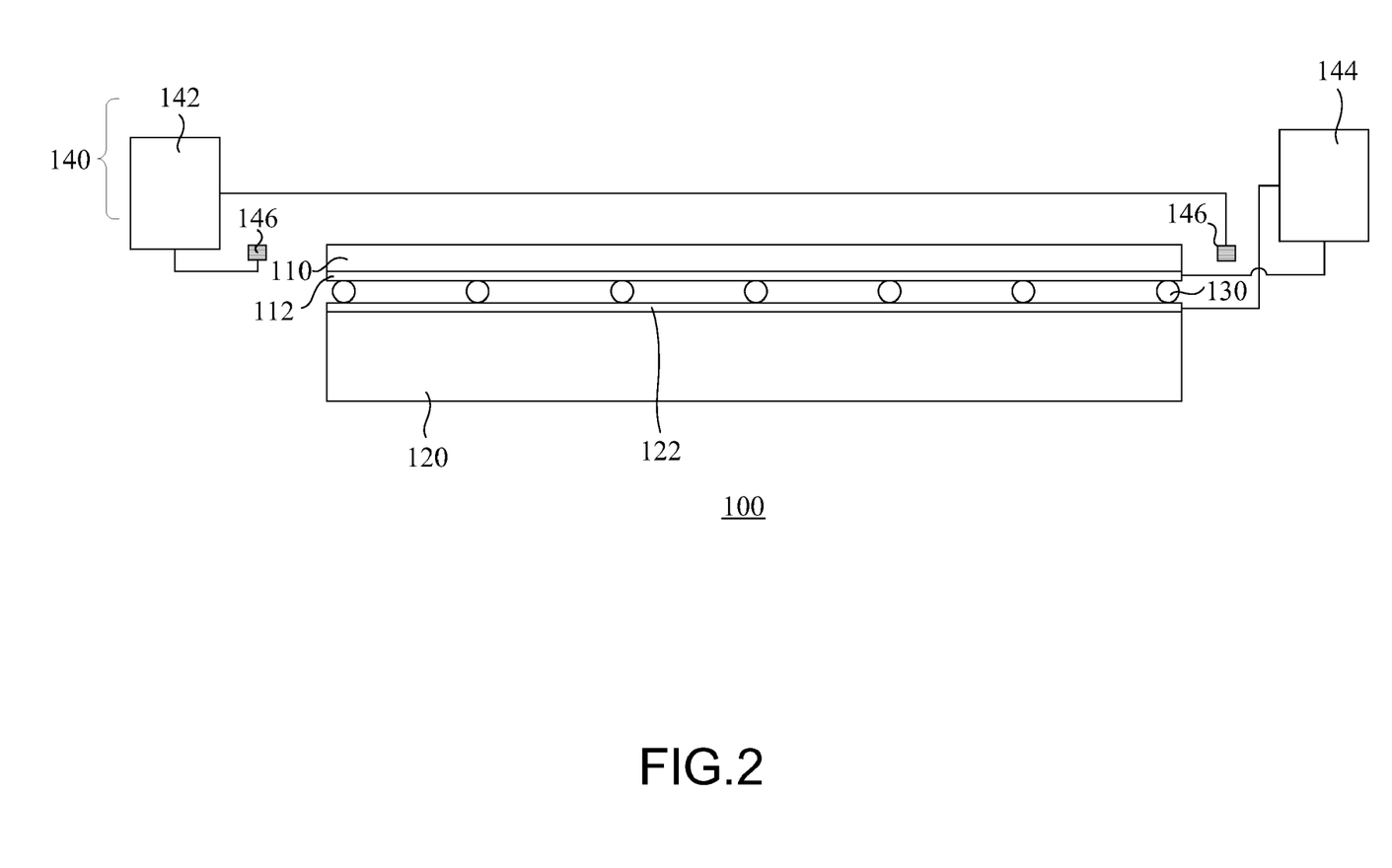
FIG. 2 is a schematic view illustrating a structure of a touch panel according to an embodiment of the present invention.

FIG. 2 illustrates a schematic view of a structure of a touch panel according to an embodiment of the present invention. In this embodiment, the touch panel 100 comprises a first substrate 110, a second substrate 120, a plurality of spacers 130 and a controller set 140. The first substrate 110 may be a flexible substrate made of polyester plastic or other transparent materials, and has a first electrode layer 112 formed thereon. More specifically, the first electrode layer 112 may be a transparent layer of indium-tin oxide or other transparent conductive materials. The second substrate 120 may be a glass substrate or a quartz substrate, and has a second electrode layer 122 facing the first electrode layer 112. Similarly, the second electrode layer 122 may also be a transparent layer of indium-tin oxide or other transparent conductive materials. The first electrode layer 112 and the second electrode layer 122 form two electrode layers that are similar to conventional five-wire resistive touch panels.

The spacers 130 are disposed between the first substrate 110 and the second substrate 120 to electrically isolate the two conductive layers. Additionally, the controller set 140 is electrically connected to the first electrode layer 112 and the second electrode layer 122 to provide a first operation mode and a second operation mode. During the first operation mode, the controller set 140 applies a uniform voltage drop electrical field on the first electrode layer 112 and the second electrode layer 122 to form a resistive touch panel configuration. On the other hand, during the second operation mode, the controller set 140 applies a uniform electrical field on the first electrode layer 112 to form a capacitive touch panel configuration.

Figure 3:
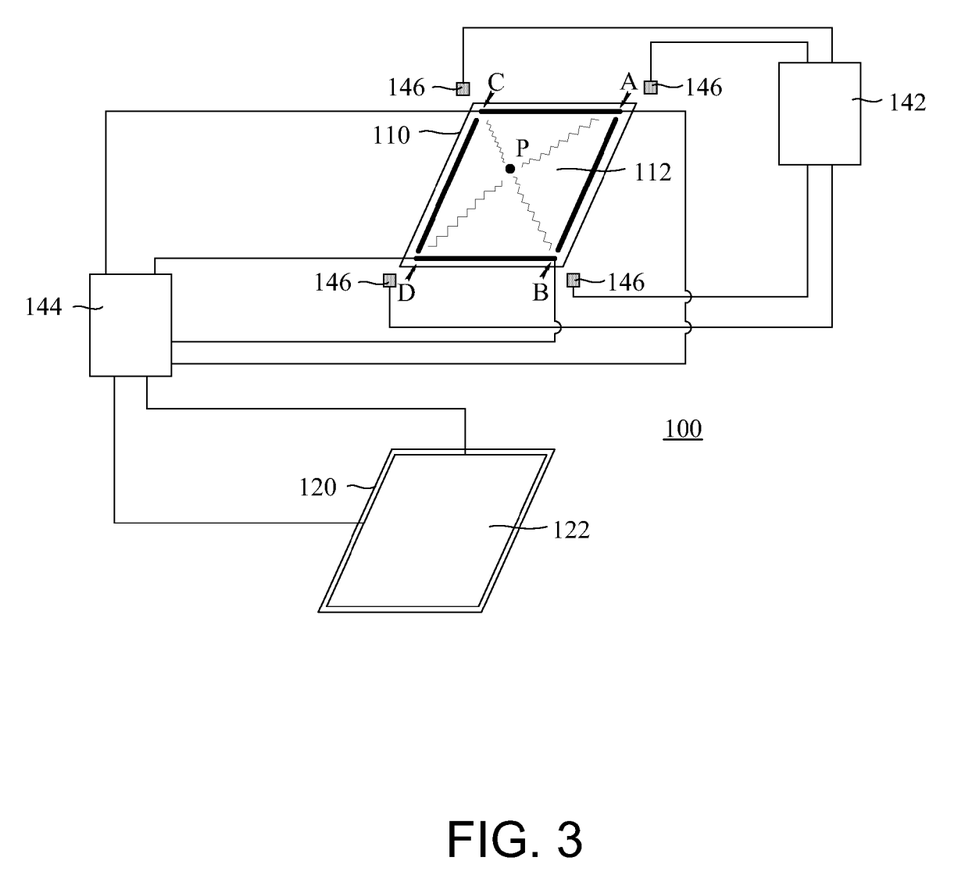
FIG. 3 is a schematic view illustrating a system configuration of a touch panel according to a first embodiment of the present invention.
Figure 4:
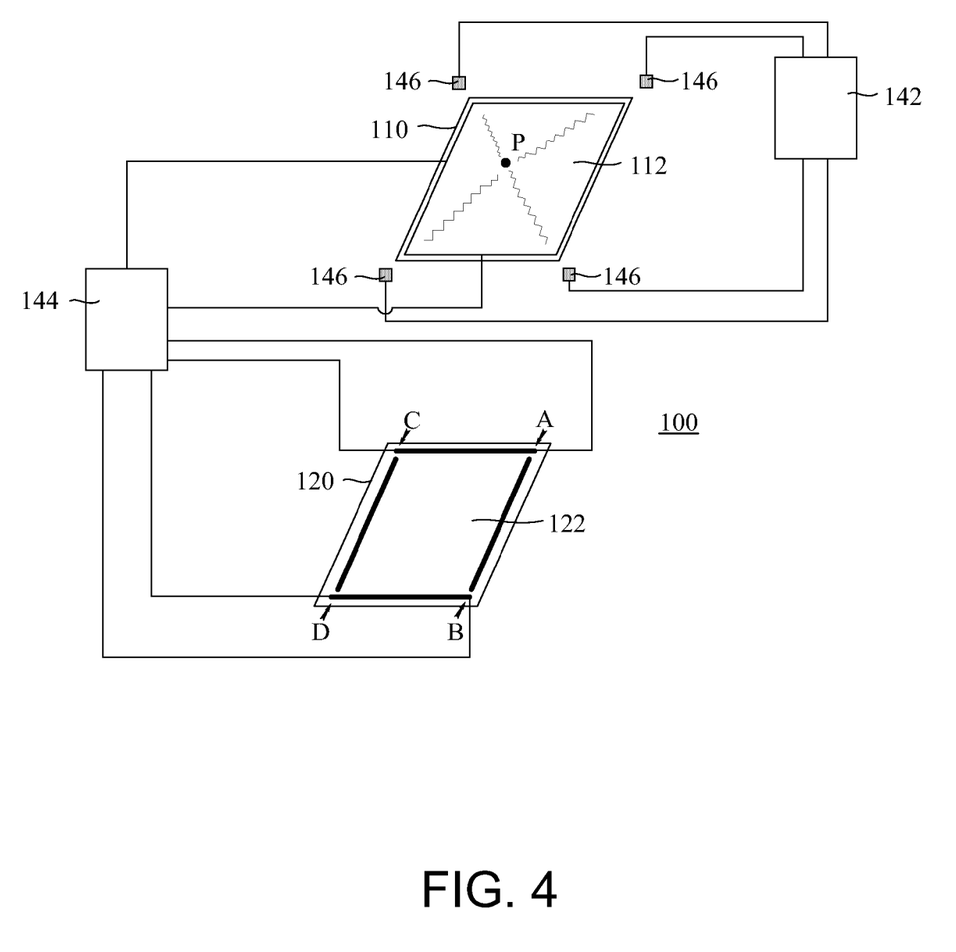
FIG. 4 is a schematic view illustrating a system configuration of a touch panel according to a second embodiment of the present invention.

In more detail, the controller set 140 of the present embodiment includes a first controller 142, a second controller 144 and a plurality of electrodes 146 (as shown in FIGS. 3 and 4). The electrodes 146 are located at a plurality of corners of the first electrode layer 112 respectively and electrically connected to the first controller 142 and the first electrode layer 112 respectively. The second controller 144 is electrically connected to the first electrode layer 112 and the second electrode layer 122 respectively. In response to different operation modes, the controller set 140 may apply a uniform voltage drop electrical field on the first electrode layer 112 and alternately apply a uniform electrical field on the first electrode layer 112, or apply a uniform voltage drop electrical field on the second electrode layer 122 and alternately apply a uniform electrical field on the first electrode layer 112. The details will be described below.

FIGS. 3 and 4 schematically illustrate the system configuration of a touch panel according to the first and second embodiments of the present invention, respectively. In FIG. 3, the first substrate 110 has four strip electrodes AC, AB, CD, BD electrically connected to the first electrode layer 112. At this point, the controller set 140 may apply a uniform voltage drop electrical field and a uniform electrical field alternately to the first electrode layer 112 to form a resistive touch panel configuration and a capacitive touch panel configuration. That is, during the first operation mode, the controller set 140 applies a uniform voltage drop electrical field on the first electrode layer 112 while having a grounded second electrode layer 122, so that the touch panel shown in FIG. 3 operates in a resistive touch panel configuration. During the second operation mode, the controller set 140 applies a uniform electrical field on the first electrode layer 112, so that the touch panel shown in FIG. 3 operates in a capacitive touch panel configuration.

More specifically, during the first operation mode, the second controller 144 applies a voltage (e.g. 5V) to the strip electrode AC and has a grounded strip electrode BD, so that a uniform voltage drop electrical field is generated along the Y axis on the first electrode layer 112. Meanwhile, the second controller 144 also has the second electrode layer 122 grounded. Thus, a resistive touch panel configuration is obtained. In this case, if a pressing force is applied to a touch point P on the first substrate 110 and further to the second substrate 120, conduction between the first electrode layer 112 and the second electrode layer 122 will be achieved simultaneously so that the second controller 144 can calculate a Y-axis coordinate (Y1) of the touch point by detecting the magnitude of the current flowing out of the second electrode layer 122. Thereafter, the second controller 144 applies a voltage (e.g. 5V) to the strip electrode CD and has a grounded strip electrode AB, so that a uniform voltage drop electrical field is generated along the X axis on the first electrode layer 112. Meanwhile, the second controller 144 also has a grounded second electrode layer 122. Then, when conduction is achieved between the first electrode layer 112 and the second electrode layer 122, the second controller 144 can calculate an X-axis coordinate (X1) of the touch point by detecting the magnitude of the current flowing out of the second electrode layer 122, and generate a first input signal comprising the X-axis and Y-axis coordinates (X1, Y1).

During the second operation mode, by applying a voltage (e.g. 5V) to the first electrode layer 112 via the four electrodes 146, the first controller 142 applies a uniform electrical field on the first electrode layer 112 to form a capacitive touch panel configuration. In this case, if a finger touches a touch point P on the first substrate 110, a variation in the electrical field of the first electrode layer 112 will occur, and a weak current will flow out of the four electrodes towards the touch point P. Then, by calculating an amount of current flowing through the four electrodes 146, the first controller 142 can obtain a second input signal comprising the X-axis and Y-axis coordinates (X2, Y2) of the touch point P.

In a second embodiment as shown in FIG. 4, the second electrode layer 122 of the second substrate 120 comprises four strip electrodes AC, AB, CD, BD. In this embodiment, the controller set 140 is adapted to alternately apply a uniform electrical field on the first electrode layer 112 and apply a uniform voltage drop electrical field on the second electrode layer 122 to form a capacitive touch panel configuration and a resistive touch panel configuration. That is, during the first operation mode, the controller set 140 is adapted to apply a uniform voltage drop electrical field on the second electrode layer 122 to have the touch panel shown in FIG. 4 operate in a resistive touch panel configuration. During the second operation mode, the controller set 140 is adapted to apply a uniform electrical field on the first electrode layer 112 to have the touch panel shown in FIG. 4 operate in a capacitive touch panel configuration.

More specifically, during the first operation mode, the second controller 144 provides a voltage (e.g. 5V) to the strip electrode AC while having a grounded strip electrode BD, so that a uniform voltage drop electrical field is generated along the Y axis on the second electrode layer 122 to obtain a resistive touch panel configuration. In this case, if a pressing force is applied to a touch point P on the first substrate 110 and further to the second substrate 120, conduction between the first electrode layer 112 and the second electrode layer 122 will be achieved simultaneously so that the second controller 144 can calculate a Y-axis coordinate (Y1) of the touch point by detecting the magnitude of the current flowing out of the first electrode layer 112. Thereafter, the second controller 144 applies a voltage (e.g. 5V) to the strip electrode CD and has a grounded strip electrode AB, so that a uniform voltage drop electrical field is generated along the X axis on the second electrode layer 122. Meanwhile, the second controller 144 also has a grounded first electrode layer 112. Then, when conduction is achieved between the first electrode layer 112 and the second electrode layer 122, the second controller 144 can calculate an X-axis coordinate (X1) of the touch point by detecting the magnitude of the current flowing out of the first electrode layer 112, and generate a first input signal comprising the X-axis and Y-axis coordinates (X1, Y1).

During the second operation mode, by applying a voltage (e.g. 5V) to the first electrode layer 112 via the four electrodes 146, the first controller 142 applies a uniform electrical field on the first electrode layer 112 to form a capacitive touch panel configuration. In this case, if a finger touches a touch point P on the first substrate 110, a variation in the electrical field of the first electrode layer 112 will occur, and a weak current will flow out of the four electrodes towards the touch point P. Then, by calculating an amount of the current flowing through the four electrodes 146, the first controller 142 can obtain a second input signal comprising the X-axis and Y-axis coordinates (X2, Y2) of the touch point P.

Accordingly, in response to the rapid switching operations of the controller set 140, the touch panel 100 of the embodiments shown in FIGS. 3 and 4 can be switched between the first operation mode and the second operation mode to provide a resistive touch panel configuration and a capacitive touch panel configuration alternately, thereby generating the first input signal and the second input signal correspondingly. In other words, the above embodiments provide characteristics of both the resistive touch panel configuration and the capacitive touch panel configuration on the basis of the conventional five-wire touch panel configuration.

However, when described with reference to a four-wire touch panel configuration, the strip electrodes AC, BD and the strip electrodes AB, CD are arranged on the first substrate 110 and the second substrate 120 respectively. Similarly, in the resistive touch panel configuration, a Y-axis coordinate (Y1) is calculated according to the first electrode layer 112 and the strip electrodes AC, BD of the first substrate 110, and an X-axis coordinate (X1) is calculated according to the first electrode layer 122 and the strip electrodes AB, CD of the second substrate 120. Then, a first input signal comprising the X-axis and Y-axis coordinates (X1, Y1) of the touch point P is calculated. On the other hand, in the capacitive touch panel configuration, a second input signal comprising the X-axis and Y-axis coordinates (X2, Y2) of the touch point P is calculated according to the first electrode layer 112. It should be noted that the present invention is not limited to be applied to the five-wire touch panel configuration and the four-wire touch panel configuration, but may also be applied to other kinds of resistive touch panel configurations with the upper electrode layer being used as a portion of the capacitive touch panel configuration.

Since the touch panels of the aforesaid embodiments have characteristics of the resistive touch panel configuration and the capacitive touch panel configuration, the user may choose any desired input tools to perform the operations on the touch panel without limitation. In particular, for the touch panels of these embodiments, the capacitive touch panel configuration can be used for collecting data of conductive input tools (e.g. finger) with a larger range movement, while the resistive touch panel configuration can be used for collecting data within a smaller touch range by a finger tip, a stylus or the like, so that various kinds of input signals can all be detected appropriately by the resistive touch panel configuration and/or the capacitive touch panel configuration to accurately determine the operational behaviors of the user. Thus, an appropriate touch panel configuration can be chosen by a system for subsequent detection, thereby dramatically reducing the likelihood of misses that are usually high in conventional touch screens and improving the operational conveniences.

Next, output methods for the touch panel of the above embodiments will be described. The output methods for the touch panel of the above embodiments may be divided into a program control process and a data interpretation process as described below.

1. Program control process: When a user is operating the touch panel by an input tool, the resistive and capacitive touch panel configurations of the above embodiments will, according to the switching operations of the controller set, switch between the first operation mode and the second operation mode alternately to detect any input signals, thereby determining what kind of input tool the user is using (i.e., a finger, a stylus, or something else). Furthermore, in response to this, a user interface is outputted for choosing an appropriate touch panel configuration in order for the system to activate a corresponding function, thereby providing an optimized operation.

2. Data interpretation process: This process calculates a location of a touch point on the touch panel accurately by combining the input signals obtained by the resistive touch panel configuration and the capacitive touch panel configuration together.

Figure 5:
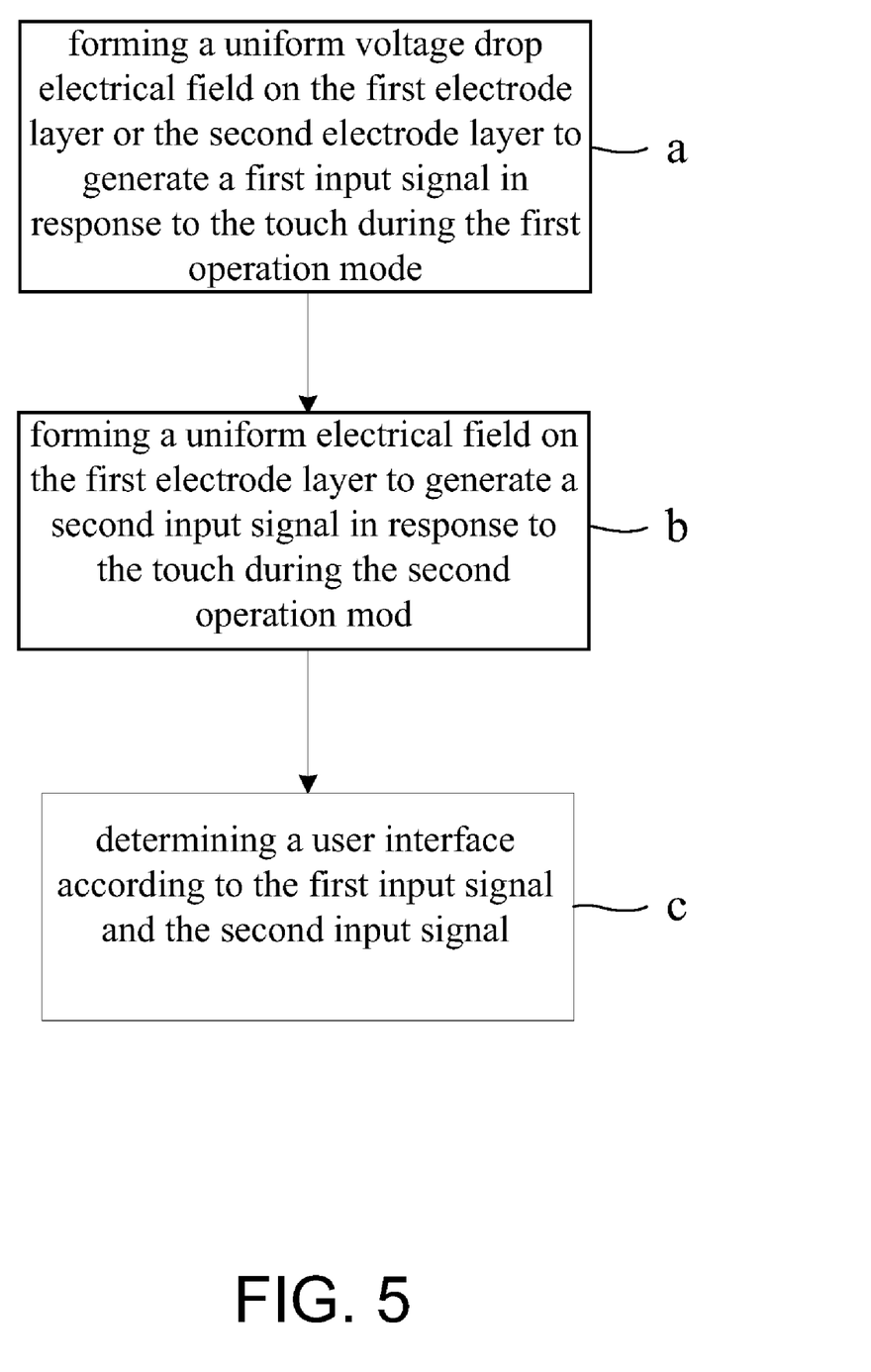
FIG. 5 is a flowchart of an output method according to an embodiment of the present invention.

More specifically, FIG. 5 shows a flowchart of an output method according to an embodiment of the present invention. This output method can recognize an input tool used by a user to allow the system to activate a corresponding function. The output method comprises the following steps: (a) forming a uniform voltage drop electrical field on the first electrode layer or the second electrode layer to generate a first input signal in response to the touch during the first operation mode; (b) forming a uniform electrical field on the first electrode layer to generate a second input signal in response to the touch during the second operation mode; and (c) determining a user interface according to the first input signal and the second input signal. It should be appreciated that steps (a) and (b) are not limited to any particular logical sequence; in other words, step (a) and the step (b) may be swapped with each other. Specifically, when step (a) precedes step (b), the first input signal is generated before the second input signal; conversely, if step (a) follows step (b), the second input signal is generated before the first input signal.

In the following description of the output method of this embodiment, reference will be made first to the previous description of the touch panel shown in FIG. 3. In step (a), the second controller 144 applies a uniform voltage drop electrical field sequentially along the X axis and the Y axis of the first electrode layer 112, and generates a first input signal comprising the X and Y coordinates (X1, Y1) in response to a touch from the user.

In step (b), the first controller 142 alternately applies a uniform electrical field on the first electrode layer 112 through the four electrodes 146, and generates a second input signal comprising the X-axis and Y-axis coordinates (X2, Y2) in response to a touch from the user.

In step (c), according to the practical conditions of the first input signal and the second input signal, an operation interface is outputted to choose the most appropriate operation module. In more detail, step (c) further comprises the following four steps: (c1) when the first input signal comprises location data but the second input signal comprises no data, it is likely that a non-conductive input tool with a small area such as a stylus is being used by the user because the resistive touch panel configuration can detect the touch while the capacitive touch panel configuration cannot; in this case, the system may choose a stylus operation interface, which primarily operates on a stylus, for subsequent use to operate the system. Then step (c2), if the first input signal and the second input signal comprise location data respectively, it is likely that a conductive input tool with a large area and sufficient touch pressure (e.g., a finger) is being used by the user, so that the touch can be detected by both the resistive touch panel configuration and the capacitive touch panel configuration; in this case, a finger operation interface which primarily operates on a finger may be chosen for subsequent use to operate the system. Further in step (c3), when the first input signal comprises no data but the second input signal comprises location data, it is likely that a conductive input tool with a large area but insufficient touch pressure (e.g., slight touch and sliding movement of a finger) is being used by the user because the capacitive touch panel configuration can detect the touch from the user while the resistive touch panel configuration cannot; in this case, a finger operation interface which primarily operates on a finger may be chosen for subsequent use to operate the system. In step (c4), when neither of the first input signal and the second input signal comprises data, it means that no input tool is being used to operate the panel.

Next, reference is made to the previous description of the touch panel shown in FIG. 4 to describe the output method of this embodiment. In the aforesaid step (a), the second controller 144 applies a uniform voltage drop electrical field sequentially along the X axis and the Y axis of the second electrode layer 122, and generates a first input signal comprising the X-axis and Y-axis coordinates (X1, Y1) in response to a touch from the user. The other two steps (b) and (c) are just the same as described in the previous embodiment and reference may be made to the above description, so no further description will be made herein. According to the output methods related to the touch panels disclosed in these embodiments, an input tool (e.g., a finger, a stylus or the like) used by the user is recognized. Depending on the differences in characteristics of the various input tools, the appropriate touch panel configuration is chosen for subsequent use to operate the system.

Figure 6:
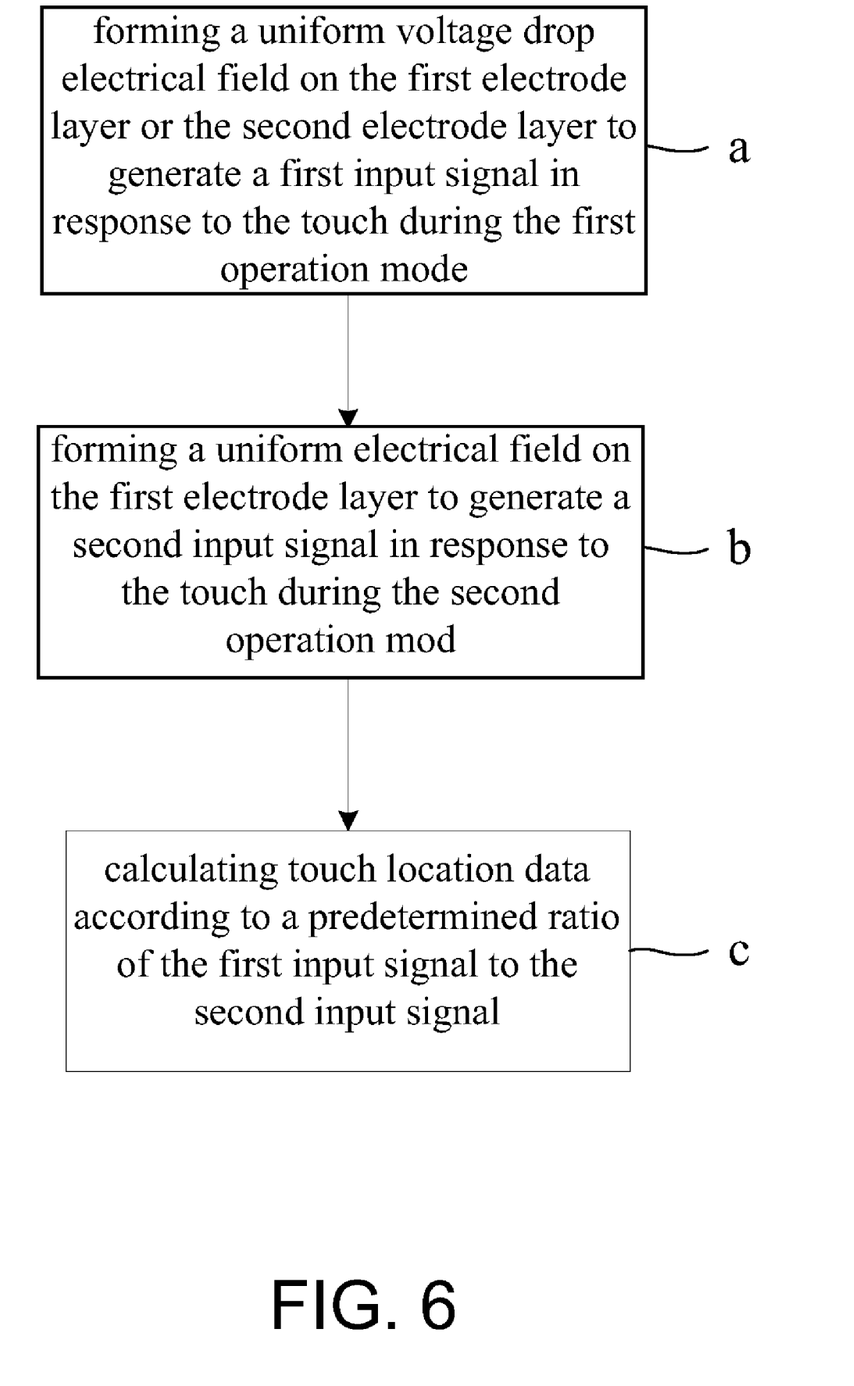
FIG. 6 is a flowchart of another output method according to an embodiment of the present invention.

FIG. 6 illustrates a flowchart of another output method according to an embodiment of the present invention. The output method utilizes input signals obtained by the resistive touch panel configuration and the capacitive touch panel configuration for coordinates of a touch point. The output method comprises the following: (a) forming a uniform voltage drop electrical field on the first electrode layer or the second electrode layer to generate a first input signal in response to the touch during the first operation mode; (b) forming a uniform electrical field on the first electrode layer to generate a second input signal in response to the touch during the second operation mode; and (c) calculating touch location data according to a predetermined ratio of the first input signal to the second input signal. It should be noted that steps (a) and (b) of this output method are identical to those of the output method shown in FIG. 5, and the corresponding description may be incorporated herein by reference. Additionally, description of the aforesaid step (c) may also be incorporated herein as reference for step (c) of the output method of this embodiment. Step (c) of the output method of this embodiment further comprises the step of calculating the touch location data according to a predetermined ratio of the first input signal to the second input signal. For example, the predetermined ratio may be 1:1, i.e., an average of the first input signal and the second input signal that has been calculated in the previous steps is used as location data of the touch point. It should be emphasized that the predetermined ratio may be adjusted flexibly depending on practical needs; for example, the predetermined ratio may be adjusted to a ratio of 2:3, i.e., two fifths of the first input signal calculated by the resistive touch panel configuration added to three fifths of the second input signal calculated by the capacitive touch panel configuration. By adjusting the predetermined ratio, errors of the touch panel configurations can be corrected to improve the operational accuracy of the system.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A touch panel, comprising:
   a first substrate, having a first electrode layer, wherein the first substrate is a flexible substrate;
   a second substrate, having a second electrode layer, facing the first electrode layer;
   a plurality of spacers, disposed between the first substrate and the second substrate;
   a controller set, electrically connected to the first electrode layer and the second electrode layer to provide rapidly and alternately switch between a first operation mode and a second operation mode, wherein the controller set applies a uniform voltage drop electrical field on the first electrode layer or the second electrode layer for forming a resistive touch panel configuration and generating a first input signal during the first operation mode, and the controller set applies a uniform electrical field on the first electrode layer for forming a capacitive touch panel configuration and generating a second input signal during the second operation mode; and
   a data of the touch location is calculated according to a predetermined ratio of the first input signal to the second input signal.

2. The touch panel of claim 1, wherein the first substrate has a plurality of strip electrodes electrically connected to the first electrode layer, and/or the second substrate has a plurality of strip electrodes electrically connected to the second electrode layer.

3. The touch panel of claim 1, wherein the controller set comprises:
   a first controller;

a plurality of electrodes, electrically connected to the first controller and the first electrode layer respectively, and located at a plurality of corners of the first electrode layer respectively; and a second controller, electrically connected to the first electrode layer and the second electrode layer.

4. The touch panel of claim 3, wherein the first controller comprises a current meter.

5. An output method for the touch panel of claim 1 for detecting a touch of a user on the first substrate, the output method comprising:

forming a uniform voltage drop electrical field on the first electrode layer or the second electrode layer to generate a first input signal in response to the touch during the first operation mode;

forming a uniform electrical field on the first electrode layer to generate a second input signal in response to the touch during the second operation mode;

rapidly and alternately switch between the first operation mode and the second operation mode; and determining a user interface according to the first input signal and the second input signal.

6. The output method of claim 5, wherein the first input signal is generated before the second input signal.

7. The output method of claim 5, wherein the second input signal is generated before the first input signal.

8. The output method of claim 5, wherein the first input signal and the second input signal comprise location data, and the user interface is a finger touch operation interface.

9. The output method of claim 5, wherein only the first input signal comprises location data, the user interface is a stylus operation interface.

10. An output method for the touch panel of claim 1 for detecting a touch of a user on the first substrate, comprising:

forming a uniform voltage drop electrical field on the first electrode layer or the second electrode layer to generate a first input signal in response to the touch during the first operation mode;

forming a uniform electrical field on the first electrode layer to generate a second input signal in response to the touch during the second operation mode;

rapidly and alternately switch between the first operation mode and the second operation mode; and calculating a data of the touch location according to a predetermined ratio of the first input signal to the second input signal.

11. The output method of claim 10, wherein the first input signal is generated before the second input signal.

12. The output method of claim 10, wherein the second input signal is generated before the first input signal.

13. The output method of claim 10, wherein the data of the touch location is an average value of the first input signal and the second input signal.

* * * * *